US008817954B2

(12) United States Patent
Lynch et al.

(10) Patent No.: US 8,817,954 B2
(45) Date of Patent: *Aug. 26, 2014

(54) USING A COMPLEX EVENTS PROCESSOR (CEP) TO DIRECT THE HANDLING OF INDIVIDUAL CALL SESSIONS BY AN INTERACTIVE VOICE RESPONSE (IVR) SYSTEM (75) Inventors: Edward M. Lynch, Toronto (CA); David D. Martin, Acton, MA (US); Jared M. Michalec, Denver, CO (US); Victor S. Moore, Lake City, FL (US); Wendi L. Nusbickel, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 196 days.

This patent is subject to a terminal disclaimer.

(21) Appl. No.: 13/404,215

(22) Filed: Feb. 24, 2012

(65) Prior Publication Data
US 2012/0163564 A1 Jun. 28, 2012

Related U.S. Application Data (63) Continuation of application No. 12/349,940, filed on Jan. 7, 2009, now Pat. No. 8,379,804.

(51) Int. Cl.
*H04M 3/42* (2006.01)
*H04M 7/12* (2006.01)
*H04L 12/58* (2006.01)

(52) U.S. Cl.
USPC ............. 379/88.04; 379/1.02; 379/88.14; 379/93.29; 379/102.03; 379/134; 455/445; 705/1.1; 706/47; 709/224

(58) Field of Classification Search
CPC ....... H04M 3/5191; H04M 7/12; H04N 7/148
USPC .......... 379/1.02, 88.04, 88.18, 93.29, 102.03, 379/134, 88.14; 455/445; 705/1.1; 706/47; 709/224

See application file for complete search history.

(56) References Cited

U.S. PATENT DOCUMENTS

| 5,598,849 | A | * | 2/1997 | Browne ........................ 600/520 |
| 5,771,387 | A | * | 6/1998 | Young et al. .................. 710/260 |
| 6,301,480 | B1 | * | 10/2001 | Kennedy et al. .............. 455/445 |
| 6,411,684 | B1 | * | 6/2002 | Cohn et al. ................... 379/88.14 |
| 6,823,054 | B1 | * | 11/2004 | Suhm et al. ................... 379/134 |
| 7,039,166 | B1 | * | 5/2006 | Peterson et al. ........... 379/88.18 |
| 7,260,191 | B1 | * | 8/2007 | Laurinavichus ........... 379/93.29 |
| 7,502,453 | B1 | * | 3/2009 | Hasmanis et al. ....... 379/102.03 |

(Continued)

*Primary Examiner* — Gerald Gauthier
(74) *Attorney, Agent, or Firm* — Hamilton, Brook, Smith & Reynolds, P.C.

(57) ABSTRACT

Event data messages can be provided by an interactive voice response (IVR) system to a complex events processor (CEP). The event data messages can include a Stream_ID and a series of textual elements. The Stream_ID can uniquely identify a call session between a caller and the IVR system. The series of textual elements can represent speech input provided by the caller. The CEP can create a text string from the series of textual elements of event data messages having the same Stream_ID. The text string can inherit the Stream_ID of the event data messages. The CEP can utilize user-defined business rules to process the text string. When the CEP issues an action message, the Stream_ID of the text string can be appended to the action message sent to the IVR system. The IVR system can modify the call session associated with the Stream_ID of the action message accordingly.

8 Claims, 3 Drawing Sheets

(56) References Cited

U.S. PATENT DOCUMENTS

| | | | |
|---|---|---|---|
| 8,009,811 B2* | 8/2011 | Sharma | 379/88.04 |
| 8,126,723 B1* | 2/2012 | Bansal et al. | 705/1.1 |
| 8,130,916 B2* | 3/2012 | Lynch et al. | 379/88.04 |
| 8,379,804 B2* | 2/2013 | Lynch et al. | 379/88.04 |
| 2009/0182872 A1* | 7/2009 | Hong | 709/224 |
| 2009/0287628 A1* | 11/2009 | Indeck et al. | 706/47 |
| 2010/0017380 A1* | 1/2010 | Naibo et al. | 707/4 |
| 2010/0166158 A1* | 7/2010 | Costello et al. | 379/88.04 |
| 2010/0172479 A1* | 7/2010 | Lynch et al. | 379/1.02 |
| 2010/0172480 A1* | 7/2010 | Lynch et al. | 379/88.04 |
| 2012/0163564 A1* | 6/2012 | Lynch et al. | 379/88.04 |

* cited by examiner

USING A COMPLEX EVENTS PROCESSOR (CEP) TO DIRECT THE HANDLING OF INDIVIDUAL CALL SESSIONS BY AN INTERACTIVE VOICE RESPONSE (IVR) SYSTEM

CROSS-REFERENCE TO RELATED APPLICATIONS

This application is a continuation of U.S. patent application Ser. No. 12/349,940, filed Jan. 7, 2009, now U.S. Pat. No. 8,379,804 which is incorporated herein in its entirety.

BACKGROUND

The present invention relates to the field of interactive voice response (IVR) systems and, more particularly, to using a complex events processor (CEP) to direct the handling of individual call sessions by an interactive voice response (IVR) system.

An interactive voice response (IVR) system is an efficient tool for directing callers to a desired person or information. The IVR system utilizes a variety of interaction files and/or applications that provide a caller with dialogs, such as spoken menu options and/or data, based upon input received from the caller. In conventional IVR systems, creating and managing the logical flow and/or content of the dialogs requires a specialist who understands the dialog encoding and software applications.

Thus, managing the dialogs of the IVR system requires additional processing by personnel who often do not understand the business relationships associated with the dialogs and/or their functions. This situation results in a disconnect between the presentation of dialogs to callers and the underlying business rules for the dialogs. A solution to this problem is for the dialog management of the IVR system to utilize a tool whose functionality is driven by user-defined business rules such as a complex events processor (CEP), as illustrated in FIG. 1 (Prior Art).

Figure 1:
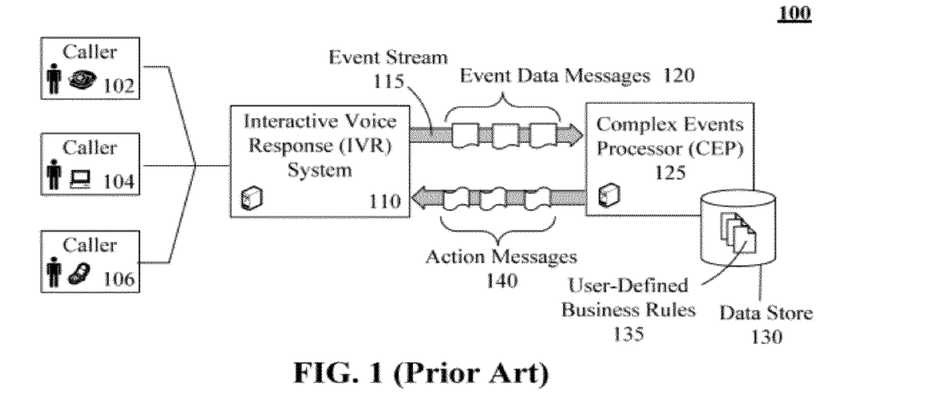
FIG. 1 (PRIOR ART) is a schematic diagram illustrating interaction between an Interactive Voice Response (IVR) system and a complex events processor (CEP).

In system 100 of FIG. 1, the IVR system 110 handles calls from various callers 102, 104, and 106. During the IVR system's 110 interactions with the callers 102, 104, and 106, situations are triggered that cause the IVR system 110 to send the CEP 125 one or more event data messages 120. The situations that trigger the IVR system 110 to generate event data messages 120 are contained within the user-defined business rules 135 stored in a data store 130 accessible by the CEP 125.

The IVR system 110 sends the event data messages 120 to the CEP 125 in an event stream 115. The CEP 125 then uses the user-defined business rules 135 to analyze the contents of the event data messages 120. Based on this analysis, the CEP 125 can issue one or more action messages 140 to the IVR system 110 to alter the operation of the IVR system 110.

System 100 provides the capability to change how the IVR system 100 functions, but only in a broad sense. That is, the action messages 140 issued by the CEP 125 modify how the IVR system 110 functions for all callers 102, 104, and 106. Such sweeping changes do not allow for the IVR system's 110 interaction with a specific caller 102, 104, or 106 to be independently modified. Thus, the conventional implementation illustrated by system 100 fulfills the need for providing modification of IVR system 110 operation based on business rules 135, but lacks the ability to narrow the focus of the modifications to individual callers 102, 104, and 106.

BRIEF SUMMARY

One aspect of the present invention can include a method for managing individual call sessions of an interactive voice response (IVR) system. Such a method can begin with an interactive voice response (IVR) system providing a complex events processor (CEP) with event data messages in an event stream. Each event data message can include a Stream_ID and a textual element from a series of textual elements. The Stream_ID can uniquely identify a call session between a caller and the IVR system. The series of textual elements can represent speech input provided by the caller. The CEP can create a text string from the textual elements of event data messages that have identical Stream_IDs. The Stream_ID of the event data messages can be associated with the text string. The CEP can utilize user-defined business rules to process the text string. When analysis of the text string requires the CEP to issue an action message, the Stream_ID associated with the text string can be appended to the action message. The action message can be conveyed to the IVR system. The call session associated with the Stream_ID of the action message can then be modified by the IVR system according to the action message. Other call sessions being handled by the IVR system can remain unaffected by the modification.

Another aspect of the present invention can include a system for managing individual call sessions of an interactive voice response (IVR) system. Such a system can include an IVR system and a complex events processor (CEP). The IVR system can be configured to execute interaction files for a call session of a caller in response to speech input provided by the caller. The speech input can be converted to a series of textual elements contained within event data messages by the IVR system. The event data messages can be associated with the call session by a unique Stream_ID. The CEP can be configured to dynamically modify the execution of the interaction files by the IVR system for the call session based on analysis of the event data messages. The modification can be contained within an action message sent by the CEP to the IVR system. The action message can be identified with the Stream_ID corresponding to the analyzed event data messages.

Yet another aspect of the present invention can include a computer program product that manages individual call sessions of an interactive voice response (IVR) system. The computer program product can include a computer usable medium containing embedded computer usable program code. The computer usable program code can be configured to create a text string from textual elements contained within event data messages having identical Stream_IDs that can be received from an IVR system. The Stream_ID can then be associated with the text string. The text string can be a textual representation of a unit of speech input provided to the IVR system by a caller associated with the Stream_ID. The computer usable program code can be configured to utilize a complex events processor (CEP) to process the text string using user-defined business rules. The computer usable program code can be configured, when indicated by analysis of the text string, to append the Stream_ID associated with the text string to the action message issued by the CEP prior to delivery of the action message to the IVR system.

DETAILED DESCRIPTION

The present invention discloses a solution that can utilize a complex events processor (CEP) to direct the handling of individual call sessions by an interactive voice response (IVR) system. A Stream_ID can be used to uniquely identify call sessions handled by the IVR system. The Stream_ID can then be added to the event data messages sent to the CEP by the IVR system. The CEP can then utilize user-defined business rules to analyze the contents of the event data messages. When the analysis requires the CEP to issue an action message to the IVR system, the Stream_ID corresponding to the event data messages can be attached to the action message. The IVR system can then execute the action message on the call session that corresponds to the Stream_ID.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk—read only memory (CD-ROM), compact disk—read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times, code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
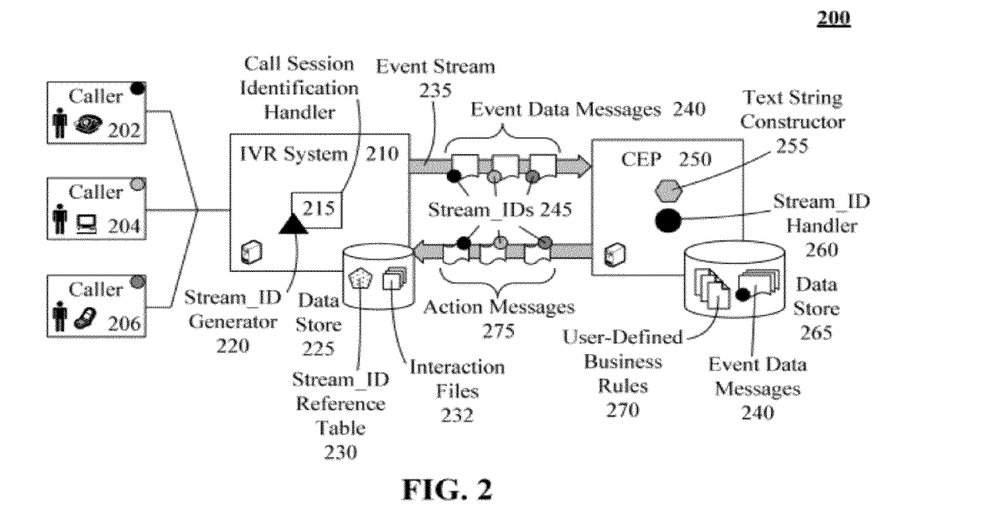
FIG. 2 is a schematic diagram illustrating a system that utilizes a complex events processor (CEP) to individually manage the call sessions of callers handled by an interactive voice response (IVR) system in accordance with embodiments of the inventive arrangements disclosed herein.

FIG. 2 is a schematic diagram illustrating a system 200 that utilizes a complex events processor (CEP) 250 to individually manage the call sessions of callers 202, 204, and 206 handled by an interactive voice response (IVR) system 210 in accordance with embodiments of the inventive arrangements disclosed herein. As used herein, the terms "caller" and "call session" are used interchangeably due to the one-to-one relationship between a caller 202, 204, and 206 and the corresponding call session created by the IVR system 210 to handle interactions with the caller 202, 204, and 206

In system 200, the IVR system 210 and CEP 250 can be configured to allow the independent modification of the call sessions handled by the IVR system's 210. That is, the configuration of system 200 can overcome the shortcomings of the conventional implementation illustrated in system 100 of FIG. 1.

In system 200, the IVR system 210 can handle interactions with multiple callers 202, 204, and 206 simultaneously. The callers 202, 204, and 206 can interact with the IVR system 210 utilizing a variety of voice communication media and equipment (not shown), including, but not limited to, a telephone, a mobile phone, a Public Switched Telephone Network (PSTN), a personal computer running a software telephone application, a cellular phone network, the Internet, an Intranet, a Voice over Internet Protocol (VoIP) enabled telephone, combinations thereof, and the like.

The IVR system 210 can represent a computing system configured to execute a variety of actions on behalf of a caller 202, 204, and 206 based on the caller's 202, 204, and 206 inputs. The actions performed by the IVR system 210 can be expressed within interaction files 232. For example, the greeting message played to a caller 202, 204, and 206 can be contained within a Voice Extensible Markup Language (VXML) document 232.

In addition to the variety of hardware and software components that enable basic functionality, the IVR system 210 can also include a call session identification handler 215 and a data store 225 containing a Stream_ID reference table 230 and the interaction files 232.

The call session identification handler 215 can represent a software component of the IVR system 210 configured to manage the Stream_IDs 245 used to uniquely identify the call sessions for each caller 202, 204, and 206 and related data exchanges. The call session identification handler 215 can utilize a Stream_ID generator 220 to create the Stream_ID 245 for a specific caller 202, 204, and/or 206. The generation algorithm used by the Stream_ID generator 220 to create Stream_IDs 245 can encompass a variety of approaches, such as random string creation and/or the use of environmental variables.

The relationship between the Stream_ID 245 created by the Stream_ID generator 220 can be recorded by the call session identification handler 215 in the Stream_ID reference table 230. The call session identification handler 215 can utilize the Stream_ID reference table 230 when determining which Stream_ID 245 corresponds to a specific call session and vice versa.

In another contemplated embodiment, the functionality of the call session identification handler 215 can be incorporated into an existing component of the IVR system 210, such as a VXML interpreter.

The IVR system 210 can add the Stream_ID 245 provided by the call session identification handler 215 to event data messages 240 being sent to the CEP 250. The event data messages 240 can represent a variety of data collected by the IVR system 210 for analysis by the CEP 250. Examples of data that can be included in event data messages 240 can include, but are not limited to, a timestamp, a phone number, text corresponding to speech input provided by a caller 202, 204, and 206, menu selections, and the like.

As shown in this illustration, each event data messages 240 has a colored circle representing the associated Stream_ID 245, which corresponds to a colored circle of a caller 202, 204, and 206. That is, the event data message 240 having the black circle contains data only about caller 202.

The IVR system 210 can send the event data messages 240 to the CEP 250 in an event stream 235. The event stream 235 can represent a communications pathway between the IVR system 210 and the CEP 250 specifically for the conveyance of event data messages 240. As such, the event stream 235 can utilize standardized communication protocols and a variety of network pathways connecting the IVR system 210 and the CEP 250.

The CEP 250 can represent a software application configured to analyze data contained within event data messages 240 in accordance with a set of user-defined business rules 270. The user-defined business rules 270 can represent simple human-readable rules that can be interpreted by the CEP 250 to provide data analysis guidance and resultant actions for execution.

In one implementation, the business rules 270 can be written to apply specifically to one or more callers 202-206. For example, a rule 270 can apply to a single caller, such as when that caller is being monitored for regulatory reasons, corporate investigatory reasons, criminal activity reasons, and the like. Many rules 270 will apply to a defined set of multiple users, such as applying to all employees of a company during work hours. Other rules 270 can apply to all callers. Generally, rules 270 can be of arbitrary complexity and can include any number of programmatically definable conditions.

The CEP 250 can also include a text string constructor 255, a Stream_ID handler 260, and a data store 265. The data store 265 can be configured to store the user-defined business rules 270 and received event data messages 240.

The text string constructor 255 can represent a software component utilized by the CEP 250 when the event data messages 240 contain textual elements corresponding to speech input. In this specific situation, the IVR system 210 can convert the speech input into a series of textual element. Each textual element can be conveyed to the CEP 250 in an event data message 240 identified with the proper Stream_ID 245. Conveyance of the event data messages 240 can preserve the ordering of the textual elements within the speech input.

If the CEP 250 were to analyze each textual element separately, the context of the textual elements can be lost, which can result in incorrect analyses and modifications to the call session. For example, the CEP 250 may change a menu prompt when the caller 202, 204, or 206 says "No" and terminate the call when the caller 202, 204, or 206 says "No thank you".

The speech input for "No thank you" can be conveyed to the CEP 250 as three separate event data messages 240, each containing a word of the speech input. If each event data message 240 for the speech input were analyzed separately, the CEP 250 would change the menu prompt for the caller 202, 204, or 206 instead of terminating the call.

Therefore, the text string constructor 255 can assemble the textual elements contained within event data messages 240 to provide the proper context of the textual elements. The text string constructor 255 can associate the Stream_ID 245 of the event data messages 240 used for construction with the resultant text string.

Since the textual elements can be conveyed in separate groupings to the CEP 250, the CEP 250 can be configured to store event data messages 240 containing textual elements in the data store 265 until all of the textual elements for the speech input have been received. Storage of the event data messages 240 can be temporary in nature to utilize the data store 265 effectively.

Further, a termination marker can be included within the event data message 240 containing the final textual element or conveyed as a separate event data message 240. Recognition of the termination marker can initiate the text string constructor 255 for the set of event data messages 240.

Building upon the above example, for the speech input "No thank you", the IVR system 210 can send the CEP 250 three event data messages 240. The first event data message 240 can contain the word "no". Since this event data message 240 does not indicate the end of the speech input, the CEP 250 can store the event data message 240 in the data store 265. The second event data message 240 containing the word "thank" can also be stored by the CEP 250. The third event data message 240 can contain the word "you" and a flag indicating the end of the speech input.

Upon receipt of the third event data message 240, the CEP 250 can invoke the text string constructor 255 to create the text string "no thank you" from the three event data messages 240. The event data messages 240 stored in the data store 265 can be deleted to recycle the storage space and the Stream_ID 245 of the three event data messages 240 can be associated with the text string.

The Stream_ID handler 260 can represent a software component of the CEP 250 configured to oversee Stream_ID 245 integrity throughout actions performed by the CEP 250. For example, the Stream_ID handler 260 can track the Stream_ID 245 of the text string and/or event data message 240 being processed by the CEP 250 and add that Stream_ID 245 to any action messages 275 generated by the CEP's 250 processing.

In an alternate embodiment, the CEP 250 can be configured to add the Stream_ID 245 to the action message 275 and the Stream_ID handler 260 can be used to identify discrepancies between the Stream_IDs 245 of the data being processed by the CEP 250 and the generated action message 275.

The action messages 275 can represent instructions that can be executed by the IVR system 210. Generation of action messages 275 by the CEP 250 can be defined within the user-defined business rules 270. Upon receipt of an action message 275, the IVR system 210 can request the call session identification handler 215 to identify the call session that corresponds to the Stream_ID 245 contained within the action message 275.

Once the correct call session is identified, the IVR system 210 can execute the instructions of the action message 275 for the identified call session. For example, an action message 275 can be executed for caller 202 without affecting the interaction of the IVR system 210 with callers 204 and 206.

It should be emphasized that current implementations for using a CEP 250 with an IVR system 210 lack this correspondence between call sessions, event data messages 240, and resultant action messages 275. Without this persistent identification of the call session, the CEP 250 cannot address the call sessions independently.

As used herein, presented data stores, including stores 225 and 265, can be a physical or virtual storage space configured to store digital information. Data stores 225 and 265 can be physically implemented within any type of hardware including, but not limited to, a magnetic disk, an optical disk, a semiconductor memory, a digitally encoded plastic memory, a holographic memory, or any other recording medium. Data stores 225 and 265 can be a stand-alone storage unit as well as a storage unit formed from a plurality of physical devices. Additionally, information can be stored within data stores 225 and 265 in a variety of manners. For example, information can be stored within a database structure or can be stored within one or more files of a file storage system, where each file may or may not be indexed for information searching purposes. Further, data stores 225 and 265 can utilize one or more encryption mechanisms to protect stored information from unauthorized access.

Figure 3:
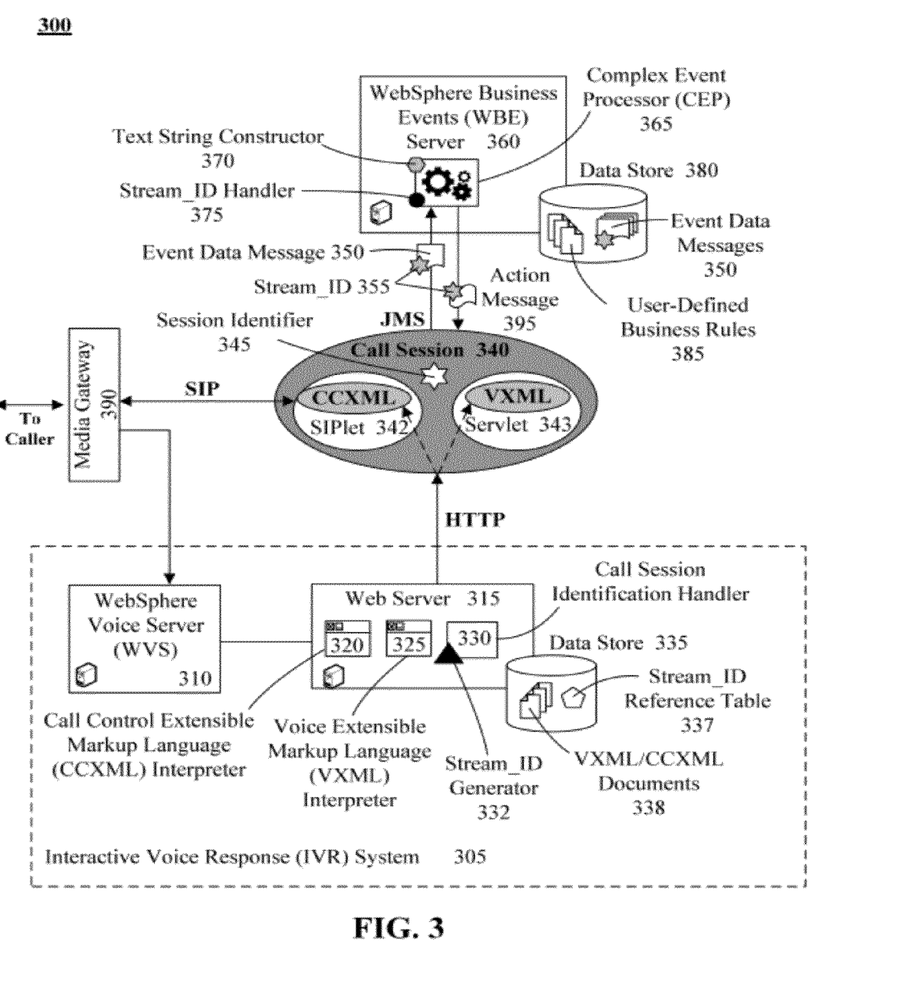
FIG. 3 is a schematic diagram illustrating a system that utilizes a WEBSPHERE BUSINESS EVENTS (WBE) server to individually manage call sessions handled by an interactive voice response (IVR) system in accordance with an embodiment of the inventive arrangements disclosed herein.

FIG. 3 is a schematic diagram illustrating a system 300 that utilizes a WEBSPHERE BUSINESS EVENTS (WBE) server 360 to individually manage call sessions 340 handled by an interactive voice response (IVR) system 305 in accordance with embodiments of the inventive arrangements disclosed herein. System 300 can represent a specific embodiment of system 200 that utilizes a WEBSPHERE environment.

In system 300, incoming calls can be handled by the media gateway 390. The media gateway 390 can represent hardware and/or software components that perform translation functions between disparate telecommunication networks. For example, the media gateway 390 can convert a call from a Public Switched Telephone Network (PSTN) protocol to an Internet Protocol (IP).

Upon receipt of an incoming call, the media gateway 390 can notify the Call Control Extensible Markup Language (CCXML) interpreter 320. Notification of the CCXML interpreter 320 can create a SIPlet 342 in which an instance of the CCXML interpreter 320 can be executed. The SIPlet 342 can represent a small software application that specifically handles Session Initiation Protocol (SIP) messages.

In response to the notification, the CCXML interpreter 320 can retrieve a CCXML document 338 from the data store 335 of the Web server 315. The CCXML document 338 can define the handling of the incoming call. In this example, the instance of the CCXML interpreter 320 within the SIPlet 342 can instruct the media gateway 390 to answer the call.

Execution of the CCXML document 338 to answer the incoming call can also initiate a servlet 343 in which an instance of a Voice Extensible Markup Language (VXML) interpreter 325 can be instantiated. The servlet 343 can represent a small software application configured to provide communication utilizing the HyperText Transfer Protocol (HTTP).

The instance of the VXML interpreter 325 running in the servlet 343 can retrieve a VXML document 338 from the data store 335 of the Web server 315. Execution of the retrieved VXML document 338 by the instance of the VXML interpreter 325 can utilize the necessary components of the WEBSPHERE VOICE SERVER (WVS) 310 to play a greeting message. The WVS 310 can include a variety of components that support speech functions, including text-to-speech (TTS), Automatic Speech Recognition (ASR), and Speaker Identity Verification (SIV).

Because system 300 is operating in a WEBSPHERE environment, the SIPlet 342 and servlet 343 created to handle the same incoming call can be coupled together in a call session 340 containment structure. Each call session 340 created can be uniquely identified by a session identifier 345. The session identifier 345 can be automatically created by the WEBSPHERE environment.

Upon creation of the call session 340, the call session identification handler 330 can be invoked. The Stream_ID generator 332 can utilize the session identifier 345 of the call session 340 exactly or in part for the Stream_ID 355. The call session identification handler 330 can then record the relationship between the call session 340 and the Stream_ID 355 in the Stream_ID reference table 337.

As the caller interacts with the IVR system 305, various CCXML and/or VXML documents 338 can be executed within the corresponding interpreter instance 320 or 325. During this interaction, the IVR system 305 can create and send event data messages 350 identified with the Stream_ID 355 corresponding to the call session 340 to the complex events processor (CEP) 365. The event data messages 350 can be conveyed to the CEP 365 using a JAVA Messaging Service (JMS).

The CEP 365 can be a component of a WEBSPHERE BUSINESS EVENTS (WBE) server 360. The CEP 365 can analyze received event data messages 350 using the set of user-defined business rules 385 contained within an accessible data store 380. The CEP 365 can include a Stream_ID handler 375 and text string constructor 370.

The Stream_ID handler 375 can manage the association of the Stream_ID 355 with action messages 395 issued by the CEP 365 as well as monitor the Stream_ID 355 integrity of the CEP 365 input and output. The text string constructor 370 can be utilized in the processing of event data messages 350 containing textual elements that correspond to speech input converted by the WVS 310.

The text string constructor 370 can create a text string that represents the speech input from the textual elements contained within the event data messages 350. These event data messages 350 can be cached in the data store 380 until the entirety of the textual elements have been received by the CEP 365.

When the CEP 365 sends the IVR system 305 an action message 395 identified with a Stream_ID 355, the call session identification handler 330 can be utilized to find the appropriate relationship in the Stream_ID reference table 337. The instruction code of the action message 395 can then be executed for the call session 340 identified by the call session identification handler 330. For example, an action message 395 can instruct the IVR system 305 to execute a CCXML document 338 instead of a VXML document 338.

In another embodiment, communications between the IVR system 305 and the CEP 365 can be handled using VXML code to enable modification to dynamic content contained within the VXML documents 338 provided by the Web server 315. Such an embodiment can utilize a queue structure of the JMS to hold event data messages 350 and/or action messages 395 for execution.

As used herein, presented data stores, including stores 335 and 380, can be a physical or virtual storage space configured to store digital information. Data stores 335 and 380 can be physically implemented within any type of hardware including, but not limited to, a magnetic disk, an optical disk, a semiconductor memory, a digitally encoded plastic memory, a holographic memory, or any other recording medium. Data stores 335 and 380 can be a stand-alone storage unit as well as a storage unit formed from a plurality of physical devices. Additionally, information can be stored within data stores 335 and 380 in a variety of manners. For example, information can be stored within a database structure or can be stored within one or more files of a file storage system, where each file may or may not be indexed for information searching purposes. Further, data stores 335 and/or 380 can utilize one or more encryption mechanisms to protect stored information from unauthorized access.

Figure 4:
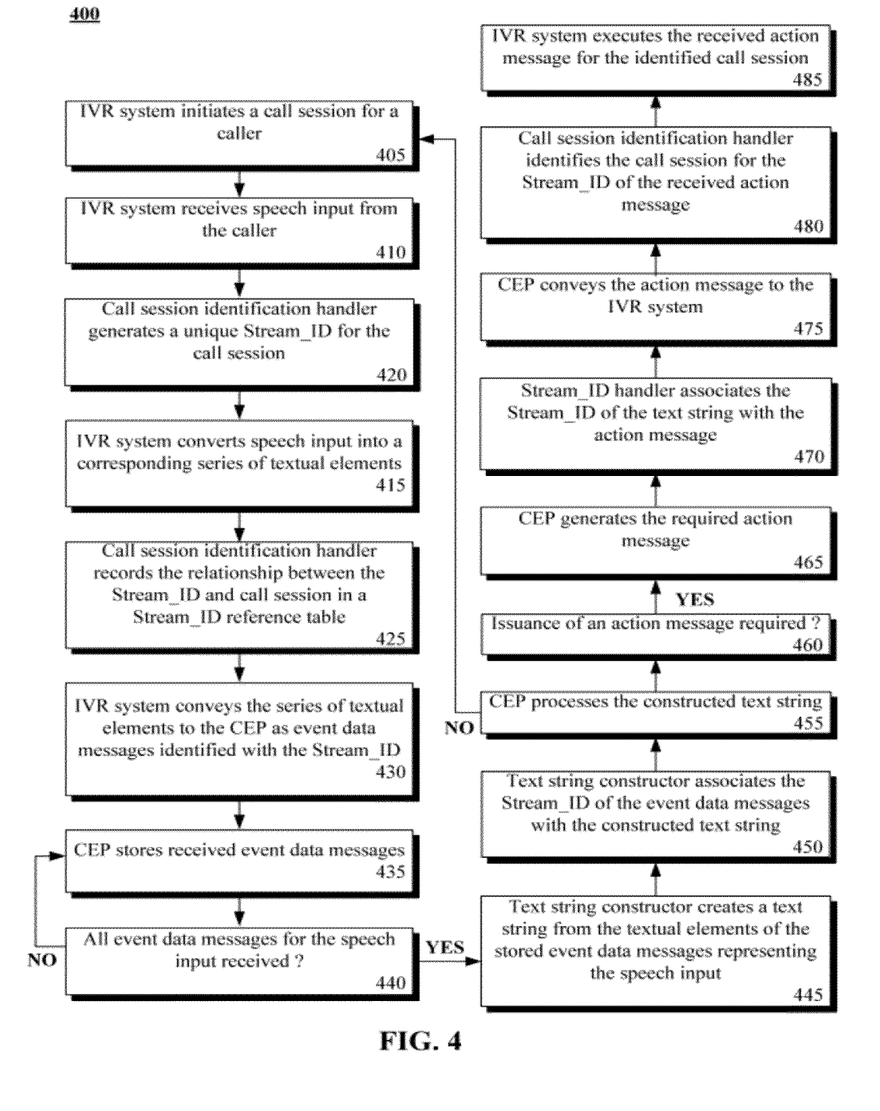
FIG. 4 is a flow chart of a method detailing the handling of speech input in accordance with an embodiment of the inventive arrangements disclosed herein.

FIG. 4 is a flow chart of a method 400 detailing the handling of speech input in accordance with an embodiment of the inventive arrangements disclosed herein. Method 400 can be performed in the context of systems 200 and/or 300.

Method 400 can begin with step 405 where the IVR system can initiate a call session for a caller. In step 410, the IVR system can receive speech input from the caller. The received speech input can be converted into a series of textual elements in step 415.

In step 420, the call session identification handler can generate a unique Stream_ID for the call session. The relationship between the Stream_ID and the call session can be recorded in a Stream_ID reference table by the call session identification handler in step 425.

In step 430, the IVR system can convey the series of textual elements to the complex events processor (CEP) as event data messages identified with the Stream_ID. The CEP can store the received event data messages in step 435. In step 440, it can be determined if the all of event data messages for the speech input have been received.

When not all of the event data messages for the speech input have been received, flow can return to step 435 where the CEP can continue to store received event data messages. When all of the event data messages for the speech input have been received, step 445 can execute where the text string constructor can create a text string from the textual elements of the stored event data messages representing the speech input.

In step 450, the text string constructor can associate the Stream_ID of the event data messages with the constructed text string. The CEP can process the constructed text string in step 455. In step 460, it can be determined if processing of the text string requires the issuance of an action message.

When processing of the text string does not require the issuance of an action message, flow can return to step 405 to restart the steps of method 400. When processing of the text string requires the issuance of an action message, step 465 can execute where the CEP can generate the required action message.

In step 470, the Stream_ID handler can associate the Stream_ID of the text string with the action message. The CEP can convey the action message to the IVR system in step 475.

In step 480, the call session identification handler can identify the call session for the Stream_ID of the received action message. The IVR system can execute the received action message for the identified call session in step 485.

The diagrams in FIGS. 2-4 illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing individual call sessions of an interactive voice response (IVR) system comprising:
    providing a plurality of event data messages in an event stream to a complex events processor (CEP) by an interactive voice response (IVR) system, wherein each event data message comprises at least a Stream_ID and an individual textual element from a series of textual elements, wherein the Stream_ID is a unique identifier that identifies a call session between a calling entity and the IVR system, and wherein the series of textual elements represents a unit of speech input provided by the calling entity converted to textual elements by the IVR system;
    creating a text string from the textual elements of event data messages having identical Stream_IDs by the CEP, wherein the Stream_ID of the event data messages is associated with the created text string, and wherein said text string is a textual representation of the speech input provided by the calling entity;
    processing the text string by the CEP, wherein the CEP utilizes a plurality of user-defined business rules;
    when analysis of the text string requires an issuance of an action message by the CEP, appending the Stream_ID associated with the text string to the action message;
    conveying the action message to the IVR system; and
    modifying the call session associated with the Stream_ID of the action message by the IVR system in accordance with the action message, wherein other call sessions being handled by the IVR system are unaffected by said modification.

2. The method of claim 1, wherein providing the plurality of event data messages further comprises:
    initiating the call session for the calling entity;
    creating the Stream_ID for the call session;
    recording an association between the Stream_ID and the call session;
    adding the Stream_ID to event data messages associated with the call session;
    sequentially inserting the event data messages into the event stream, wherein insertion of the event data message coincides with an order of the textual elements within the series of textual elements, and, wherein the event stream comprises a plurality of event data messages having a plurality of Stream_IDs corresponding to a plurality of calling entities; and
    conveying the event stream to the CEP.

3. The method of claim 2, wherein the creating of the Stream_ID utilizes a unique call session identifier created by the IVR system for the call session of the calling entity.

4. The method of claim 3, wherein the unique call session identifier corresponds to at least one of a Voice Extensible Markup Language (VXML) session identifier and a Call Control Extensible Markup Language (CCXML) session identifier.

5. The method of claim 1, wherein the creating of the text string by the CEP further comprises:
    storing received event data messages in a repository;
    identifying a termination of data for a specific Stream_ID;
    retrieving event data messages from the repository having the specific Stream_ID; and
    constructing the text string from the textual elements contained within the retrieved event data messages.

6. The method of claim 1, wherein the CEP is provided by a WEBSPHERE BUSINESS EVENT (WBE) server.

7. The method of claim 1, wherein the providing of the plurality of event data messages utilizes a JAVA MESSAGING SERVICE (JMS).

8. The method of claim 1, wherein the issuance of the action message by the CEP occurs asynchronously from operation of the IVR system.

* * * * *